(12) United States Patent
Fang et al.

(10) Patent No.: US 12,731,873 B2
(45) Date of Patent: Sep. 8, 2026

(54) BATTERY CELL, BATTERY, POWER CONSUMPTION DEVICE, AND MANUFACTURING METHOD AND DEVICE OF BATTERY CELL

(71) Applicant: CONTEMPORARY AMPEREX TECHNOLOGY (HONG KONG) LIMITED, Hong Kong (CN)

(72) Inventors: Kun Fang, Ningde City (CN); Zhijun Guo, Ningde City (CN); Ying Li, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 733 days.

(21) Appl. No.: 17/838,774

(22) Filed: Jun. 13, 2022

(65) Prior Publication Data

US 2023/0122619 A1 Apr. 20, 2023

Related U.S. Application Data

(63) Continuation of application No. PCT/CN2021/125100, filed on Oct. 20, 2021.

(51) Int. Cl.
*H01M 50/572* (2021.01)
*H01M 50/107* (2021.01)
*H01M 50/531* (2021.01)

(52) U.S. Cl.
CPC ....... *H01M 50/572* (2021.01); *H01M 50/107* (2021.01); *H01M 50/531* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 8,043,746 | B2 | 10/2011 | Masson et al. | |
| 2007/0141449 | A1* | 6/2007 | Kim | H01M 50/171 429/185 |

(Continued)

FOREIGN PATENT DOCUMENTS

| | | | |
|---|---|---|---|
| CA | 525730 | A | 5/1956 |
| CN | 203800108 | U | 8/2014 |

(Continued)

OTHER PUBLICATIONS

CN 113346201 Machine Translation (Year: 2021).*

(Continued)

*Primary Examiner* — Mark Ruthkosky
*Assistant Examiner* — Sarah J Jacobson
(74) *Attorney, Agent, or Firm* — Scully, Scott, Murphy & Presser, P.C.

(57) ABSTRACT

Embodiments of the present application provide a battery cell, a battery, a power consumption device, and a manufacturing method and device of a battery cell, which belong to the field of battery technology. A battery cell includes a housing, an electrode assembly, an end cover, and a current collecting member. The electrode assembly has a tab. The housing with an opening is configured to accommodate the electrode assembly. The end cover is configured to cover the opening and connected to the housing. The current collecting member is located in the housing, and is configured to connect the tab and the housing. An inner side surface of the housing is protruded with a first restraint member, and the current collecting member abuts against a side of the first restraint member facing the electrode assembly, which can reduce the risk of failure of electrical connection between a battery assembly and a housing.

6 Claims, 8 Drawing Sheets

(56) References Cited

U.S. PATENT DOCUMENTS

| | | | | |
|---|---|---|---|---|
| 2009/0214943 | A1 | 8/2009 | Masson et al. | |
| 2015/0279574 | A1 | 10/2015 | So et al. | |
| 2017/0372844 | A1 | 12/2017 | Lee et al. | |
| 2022/0344749 | A1 | 10/2022 | Makino et al. | |
| 2024/0204372 | A1* | 6/2024 | Hwangbo | ........... H01M 50/505 |

FOREIGN PATENT DOCUMENTS

| | | | |
|---|---|---|---|
| CN | 112510323 | A | 3/2021 |
| CN | 113346201 | A | 9/2021 |
| CN | 216250920 | U | 4/2022 |
| EP | 4080634 | A2 | 10/2022 |
| JP | 2001126710 | A | 5/2001 |
| JP | 2002042771 | A | 2/2002 |
| JP | 2012248466 | A | 12/2012 |
| WO | 2019148662 | A1 | 8/2019 |

OTHER PUBLICATIONS

Extended European Search Report dated Jul. 19, 2023 received in European Patent Application No. EP 21873707.0.

International Search report and Written Opinion dated Jul. 20, 2022 received in International Application No. PCT/ CN2021/125100.

Office Action dated Sep. 1, 2025 received in Chinese Patent Application No. 202180092647.X.

* cited by examiner

BATTERY CELL, BATTERY, POWER CONSUMPTION DEVICE, AND MANUFACTURING METHOD AND DEVICE OF BATTERY CELL

CROSS-REFERENCE TO RELATED APPLICATIONS

This application is a continuation of International Application No. PCT/CN2021/125100, filed on Oct. 20, 2021, the disclosure of which is hereby incorporated by reference in its entirety.

TECHNICAL FIELD

The present application relates to the field of battery technology, and in particular, to a battery cell, a battery, a power consumption device, and a manufacturing method and device of a battery cell.

BACKGROUND

A battery most commonly used in a vehicle is a lithium-ion battery. As a rechargeable battery, the lithium-ion battery has advantages such as small size, high energy density, high power density, multiple cycles of use, and long storage time.

A battery cell generally includes a housing and an electrode assembly, the housing is configured to accommodate the electrode assembly and an electrolytic solution, and electrical energy is generated by movement of metal ions (such as lithium ions) between a positive electrode sheet and a negative electrode sheet of the electrode assembly. For a general battery cell, an electrode assembly needs to be electrically connected to a housing, so that the housing can serve as a positive output electrode or a negative output electrode of the battery cell. Currently, the electrical connection between the electrode assembly and the housing is prone to failure.

SUMMARY

Embodiments of the present application provide a battery cell, a battery, a power consumption device, and a manufacturing method and device of a battery cell, which can reduce the risk of failure of electrical connection between a battery assembly and a housing.

In a first aspect, an embodiment of the present application provides a battery cell, including: an electrode assembly having a tab; a housing having an opening, where the housing is configured to accommodate the electrode assembly; an end cover configured to cover the opening and connect to the housing in a sealing manner; and a current collecting member accommodated in the housing and located on a side of the electrode assembly facing the end cover, where the current collecting member is configured to connect the tab and the housing to realize electrical connection between the tab and the housing, where an inner side surface of the housing is protruded with a first restraint member, the first restraint member is configured to restrain movement of the end cover in a direction close to the electrode assembly, and the current collecting member abuts against a side of the first restraint member facing the electrode assembly.

In the above technical solution, the electrical connection between the tab and the housing is realized through the current collecting member, and the current collecting member abuts against the side of the first restraint member facing the electrode assembly to ensure good current flow between the current collecting member and the housing. The first restraint member not only has a restraining effect on the end cover, but also has a restraining effect on the current collecting member, so that the current collecting member restrains movement of the electrode assembly, reduces a displacement of the movement of the electrode assembly in the housing in a direction of the end cover, reduces the risk of failure of the connection between the tab and the current collecting member due to the excessive displacement of the electrode assembly, and further reduces the risk of failure of the electrical connection between the battery assembly and the housing.

In some embodiments, the current collecting member includes: a body portion located on the side of the first restraint member facing the electrode assembly, where the body portion is configured to connect the tab; and an elastic portion connected to the body portion, where the elastic portion is configured to abut against the first restraint member in a direction away from the electrode assembly.

In the above technical solution, the elastic portion abuts against the first restraint member in the direction away from the electrode assembly. The elastic portion has elastic deformability, and the elastic portion can be elastically deformed according to the change of a distance between the body portion and the first restraint member, so that the elastic portion has a good buffering effect on the electrode assembly, which reduces the risk of damage due to rigid impact between the electrode assembly and the current collecting member. In addition, the elastic portion will always maintain an abutting state of abutting against the first restraint member when the battery assembly moves in the housing due to vibration of the battery cell, which reduces the risk of failure of the electrical connection between the current collecting member and the housing due to the vibration of the battery cell.

In some embodiments, the elastic portion is an elastic sheet that is bent and arranged on the body portion.

In the above technical solution, the elastic portion is an elastic sheet that is bent and arranged on the body portion, which is simple in structure, easy to mold, and has good deformability.

In some embodiments, the elastic portion includes: a first bending portion configured to abut against the first restraint member; and a second bending portion configured to connect the first bending portion and the body portion, where in a thickness direction of the end cover, a gap is provided between a part of the body portion opposite to the first bending portion and the first bending portion.

In the above technical solution, the elastic portion includes the first bending portion and the second bending portion connected to each other. The first bending portion and the second bending portion can be formed by means of bending, which is simple to mold. The gap is provided between the part of the body portion opposite to the first bending portion and the first bending portion, and the gap between the body portion and the first bending portion can provide a deformation space for the first bending portion, so that the first bending portion not only has an ability to be deformed in a direction away from the body portion, but also has an ability to be deformed in a direction close to the body portion, and thus the elastic portion has a good buffering effect on the electrode assembly when the electrode assembly moves in a direction close to the end cover, which reduces the risk of damage due to rigid impact between the electrode assembly and the current collecting member.

In some embodiments, the battery cell further includes an elastic layer, and the elastic layer is supported between the body portion and the first bending portion.

In the above technical solution, the elastic layer is supported between the body portion and the first bending portion. The elastic layer can have a good elastic support effect on the first bending portion, enhance a buffering effect of the elastic portion on the electrode assembly, and improve the ability of restoring deformation after deformation of the first bending portion in the direction close to the body portion.

In some embodiments, the second bending portion is connected to an edge of the body portion, and the first bending portion is bent and arranged in a direction close to the body portion relative to the second bending portion.

In the above technical solution, the second bending portion is connected to the edge of the body portion, so that the second bending portion has good deformability relative to the body portion. The first bending portion is bent and arranged in the direction close to the body portion relative to the second bending portion, so that the first bending portion has good deformability relative to the second bending portion, and thus the whole elastic portion has good deformability. In addition, since the second bending portion is connected to the edge of the body portion, the second bending portion is allowed to be closer to the inner side surface of the housing, and more of the first bending portion can abut against the first restraint member, which increases a contact area between the first bending portion and the first restraint member, and increases a current flow area between the current collecting member and the housing.

In some embodiments, the body portion has an outer surface facing the end cover, the outer surface is provided with a first accommodating portion, and the first accommodating portion is configured to accommodate at least a part of the elastic portion.

In the above technical solution, the outer surface of the body portion is provided with the first accommodating portion, and the first accommodating portion can provide an accommodating space for the elastic portion, which reduces the size of the elastic portion protruding from the outer surface of the body portion, reduces an internal space of the housing occupied by the elastic portion, frees up more space for the electrode assembly, and is beneficial to improving energy density of the battery cell.

In some embodiments, the elastic portion has an abutting surface facing the end cover, the abutting surface is configured to abut against the first restraint member, and the abutting surface is flush with the outer surface.

In the above technical solution, the abutting surface is flush with the outer surface of the body portion, so that the outer surface of the body portion can also abut against the first restraint member, which increases a contact area between the current collecting member and the first restraint member, and further increases a current flow area between the current collecting member and the housing.

In some embodiments, the body portion is provided with a through hole in the area where the first accommodating portion is provided.

In the above technical solution, the body portion is provided with the through hole, and emissions inside the battery cell located on the side of the body portion facing the electrode assembly can flow to the side of the body portion facing the end cover through the through hole, which is beneficial for the internal emissions to be discharged to the outside of the battery cell when the battery cell suffers from thermal runaway, and improves the safety of the battery cell.

In some embodiments, the body portion is provided with a plurality of the elastic portions distributed at intervals in a circumferential direction of the body portion.

In the above technical solution, the plurality of elastic portions distributed at intervals in the circumferential direction of the body portion can all abut against the first restraint member, which increases a contact area between the current collecting member and the first restraint member, further increases a current flow area between the current collecting member and the housing, and realizes a large area of current flow. In addition, the plurality of elastic portions distributed at intervals in the circumferential direction of the body portion can all have a buffering effect on the electrode assembly, which further reduces the risk of damage to the electrode assembly due to impact.

In some embodiments, the body portion has a plurality of welding regions distributed at intervals in the circumferential direction, the welding regions are configured to be welded with the tab, and at least one of the elastic portions is disposed between two adjacent welding regions in the circumferential direction of the body portion.

In the above technical solution, at least one elastic portion is disposed between two adjacent welding regions in the circumferential direction of the body portion, so that the elastic portion and the welding regions configured to be welded with the tab of the body portion are arranged alternately in the circumferential direction of the body portion, and a welding mark formed by welding the welding region and the tab is not easily affected by the elastic portion, so that the size of the welding mark in the radial direction of the current collecting member is as large as possible, which reduces the risk of polarization of the electrode assembly, and improves the service life of the battery cell.

In some embodiments, the body portion has an inner surface away from the end cover, the inner surface is provided with a second accommodating portion located in the welding region, and the second accommodating portion is configured to accommodate at least a part of the tab.

In the above technical solution, the inner surface of the body portion is provided with the second accommodating portion located in the welding region, and the second accommodating portion can accommodate at least a part of the tab, which reduces an internal space of the housing occupied by the tab, frees up more space for the main body portion of the electrode assembly, and thus is beneficial to improving energy density of the battery cell.

In some embodiments, the current collecting member includes: a body portion located on the side of the first restraint member facing the electrode assembly, where the body portion is configured to connect the tab; and a hook portion connected to the body portion, where the hook portion is configured to hook-fit with the first restraint member to restrain movement of the body portion in a direction close to or away from the end cover.

In the above technical solution, the hook portion of the current collecting member is hook-fit with the first restraint member, which can restrain the movement of the body portion in the direction close to or away from the end cover, can always maintain tight contact between the current collecting member and the first restraint member, enhances stability of the electrical connection between the current collecting member and the housing, and ensures a current flow area between the current collecting member and the housing.

In some embodiments, the hook portion includes: a first connecting portion connected to the body portion, where the first connecting portion is configured to abut against the side of the first restraint member facing the electrode assembly; a second connecting portion configured to abut against a side of the first restraint member away from the electrode assembly; and a third connecting portion configured to connect the first connecting portion and the second connecting portion.

In the above technical solution, the first connecting portion and the second connecting portion of the hook portion abut against two sides of the first restraint member respectively, so that the hook portion and the first restraint member have a larger contact area, which increases a current flow area between the current collecting member and the housing.

In some embodiments, the first connecting portion, the third connecting portion and the second connecting portion are connected in sequence and jointly define a restraint groove, and the restraint groove is configured to accommodate at least a part of the first restraint member. The hook portion in this structure has a simple structure and is easy to mold.

In some embodiments, the battery cell further includes: a conductive layer, where the conductive layer is configured to connect the first restraint member and the third connecting portion.

In the above technical solution, the first restraint member and the third connecting portion are connected by the conductive layer, which realizes electrical connection between the first restraint member and the third connecting portion, and further increases a current flow area between the current collecting member and the housing.

In some embodiments, the first restraint member is in an annular structure extending in a circumferential direction of the housing.

In the above technical solution, the first restraint member is in an annular structure, which is easy to mold and manufacture. The first restraint member can restrain the end cover in the entire circumference, which ensures the restraining ability of the first restraint member for the end cover and the current collecting member.

In some embodiments, a roller groove is provided at a part of an outer side surface of the housing corresponding to the first restraint member.

In the above technical solution, the outer side surface of the housing is provided with the roller groove, and during the process of molding the roller groove, the housing forms the first restraint member at a position corresponding to the roller groove, so as to restrain the current collecting member and the electrode assembly in the housing. The molding of the first restraint member is simple, which makes the assembly of the battery cell simpler and more economical.

In some embodiments, the housing has a second restraint member, and in a thickness direction of the end cover, at least a part of the end cover is located between the first restraint member and the second restraint member, and the first restraint member and the second restraint member are configured to jointly restrain movement of the end cover in the thickness direction of the end cover.

In the above technical solution, the second restraint member and the first restraint member can jointly restrain the movement of the end cover in the thickness direction of the end cover, so that the end cover cannot move relative to the housing, which ensures the firmness of the connection between the end cover and the housing.

In some embodiments, the battery cell further includes: a sealing member configured to seal the end cover and the housing, where the sealing member is located on a side of the first restraint member away from the electrode assembly.

In the above technical solution, the sealing connection between the end cover and the housing is realized by the sealing member, so as to ensure the sealing of the end cover and the housing. The sealing member is located on the side of the first restraint member away from the electrode assembly, and the current collecting member is less likely to affect the arrangement of the sealing member, which improves the sealing between the end cover and the housing.

In a second aspect, an embodiment of the present application provides a battery, including a plurality of the battery cells provided by any one of the embodiments of the first aspect.

In a third aspect, an embodiment of the present application provides a power consumption device, including the battery provided by any one of the embodiments of the second aspect.

In a fourth aspect, an embodiment of the present application provides a manufacturing method of a battery cell, including: providing a housing having an opening; providing an electrode assembly having a tab; providing an end cover; providing a current collecting member; connecting the current collecting member to the tab; accommodating the electrode assembly and the current collecting member in the housing; processing a roller groove on the housing, so that a part of the housing forming the roller groove correspondingly forms a first restraint member protruding from an inner side surface of the housing; and covering the opening with the end cover, and connecting the end cover to the housing in a sealing manner, where the first restraint member is configured to restrain movement of the end cover in a direction close to the electrode assembly, the current collecting member is located on a side of the electrode assembly facing the end cover, and the current collecting member abuts against a side of the first restraint member facing the electrode assembly.

In some embodiments, the current collecting member includes a body portion and an elastic portion, the body portion is connected to the tab, and the elastic portion is connected to the body portion; during the process of processing the roller groove on the housing, the portion of the housing forming the roller groove squeezes the elastic portion, so that the elastic portion is bent relative to the body portion, and the elastic portion abuts against the first restraint member in a direction away from the electrode assembly.

In the above technical solution, during the process of processing the roller groove on the housing, the part of the housing forming the roller groove squeezes the elastic portion of the current collecting member, so that the elastic portion is bent relative to the body portion and maintains elastic abutting with the first restraint member, that is, after processing the roller groove on the housing, the elastic portion of the current collecting member naturally elastically abuts against the first restraint member, which improves the assembling efficiency of the battery cell.

In some embodiments, after covering the opening with the end cover, the manufacturing method further includes: flanging the housing, so that the housing forms a second restraint member, and the second restraint member and the first restraint member jointly restrain movement of the end cover in a thickness direction of the end cover.

In the above technical solution, the second restraint member for restraining the end cover is formed by flanging the housing. The molding method of the second restraint member is simple, and molding efficiency is high.

In a fifth aspect, an embodiment of the present application provides a manufacturing device of a battery cell, including: a first providing apparatus configured to provide a housing having an opening; a second providing apparatus configured to provide an electrode assembly having a tab; a third providing apparatus configured to provide an end cover; a fourth providing apparatus configured to provide a current collecting member; and an assembling apparatus configured to connect the current collecting member to the tab, accommodate the electrode assembly and the current collecting member in the housing, process a roller groove on the housing, so that a part of the housing forming the roller groove correspondingly forms a first restraint member protruding from an inner side surface of the housing, and cover the opening with the end cover, and connect the end cover to the housing in a sealing manner, where the first restraint member is configured to restrain movement of the end cover in a direction close to the electrode assembly, the current collecting member is located on a side of the electrode assembly facing the end cover, and the current collecting member abuts against a side of the first restraint member facing the electrode assembly.

BRIEF DESCRIPTION OF THE DRAWINGS

In order to illustrate the technical solutions in embodiments of the present application more clearly, brief description will be made below to accompanying drawings required in the embodiments. It should be understood that the following accompanying drawings illustrate some embodiments of the present application only, and thus should not be considered as limiting the scope. Other related drawings could be obtained based on these accompanying drawings by those ordinary skilled in this art without creative efforts.

Figure 1:
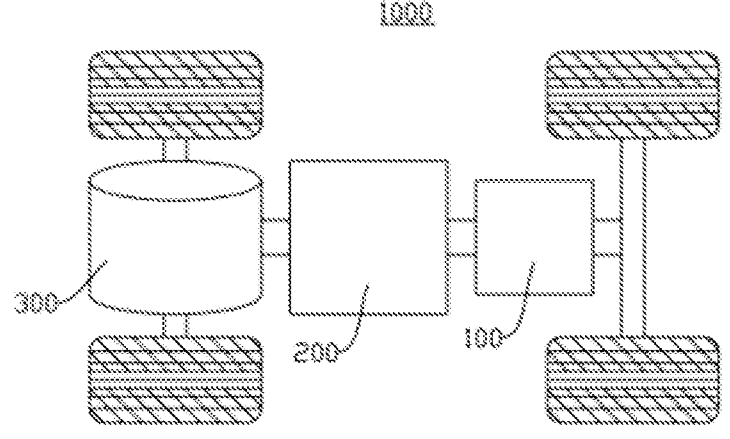
FIG. 1 is a schematic structural diagram of a vehicle provided by some embodiments of the present application.

Icons: 10—battery cell; 11—housing; 111—inner side surface; 112—first restraint member; 113—outer side surface; 114—roller groove; 115—second restraint member; 12—electrode assembly; 121—main body portion; 122—tab; 13—end cover; 14—current collecting member; 141—body portion; 1411—outer surface; 1412—first accommodating portion; 1413—through hole; 1414—welding region; 1415—inner surface; 1416—second accommodating portion; 142—elastic portion; 1421—first bending portion; 1422—second bending portion; 1423—abutting surface; 144—hook portion; 1441—first connecting portion; 1442—second connecting portion; 1443—third connecting portion; 1444—restraint groove; 15—sealing member; 16—electrode terminal; 17—elastic layer; 18—conductive layer; 20—box; 21—first portion; 22—second portion; 100—battery; 200—controller; 300—motor; 1000—vehicle; 2000—manufacturing device; 2100—first providing apparatus; 2200—second providing apparatus; 2300—third providing apparatus; 2400—fourth providing apparatus; 2500—assembling apparatus; Z—thickness direction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims or the foregoing accompanying drawings of the present application are intended to distinguish between different objects, rather than to describe a specific order or primary-secondary relationship.

The word "embodiment" referred to in the present application means that specific features, structures, or characteristics described in combination with the embodiment can be included in at least one embodiment of the present application. The word defined at various locations in the specification does not necessarily refer to the same embodiment, or an independent or alternative embodiment exclusive of another embodiment.

In the description of the present application, it should be noted that unless otherwise explicitly specified and defined, terms "installation", "interconnection", "connection" and "attachment" should be understood in a broad sense, for example, they may either be a fixed connection, or a detachable connection, or an integrated connection; and they may either be a direct connection, or an indirect connection through an intermediary, or may be a communication between interiors of two elements. Those of ordinary skill in the art may understand specific meanings of the foregoing terms in the present application according to specific conditions.

In the embodiments of the present application, like components are denoted by like reference signs, and for the sake of brevity, detailed description of the like components is omitted in different embodiments. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" refers to two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiment of the present application. The battery cells may be cylindrical, flat, cuboid, or in another shape, which is not limited by the embodiment of the present application. The battery cell is generally divided into three types according to the way of packaging: a cylindrical battery cell, a square battery cell and a pouch battery cell, which is also not limited by the embodiment of the present application.

The battery mentioned in the embodiment of the present application refers to a single physical module that includes one or more battery cells to provide a higher voltage and capacity. For example, the battery mentioned in the present application may include a battery module, a battery pack, or the like. The battery generally includes a box for packaging one or more battery cells. The box may prevent liquid or other foreign matters from affecting the charging or discharging of the battery cells.

The battery cell includes an electrode assembly and an electrolytic solution, and the electrode assembly is composed of a positive electrode sheet, a negative electrode sheet and a separator. The battery cell mainly relies on the movement of metal ions between the positive electrode sheet and the negative electrode sheet to operate. The positive electrode sheet includes a positive current collector and a positive active substance layer. The positive active substance layer is coated on a surface of the positive current collector, and the positive current collector not coated with the positive active substance layer protrudes from the positive current collector coated with the positive active substance layer and is used as a positive tab. As an example, in a lithium-ion battery, the material of the positive current collector may be aluminum, and the positive active substance may be lithium cobalt oxide, lithium iron phosphate, ternary lithium or lithium manganate, etc. The negative electrode sheet includes a negative current collector and a negative active substance layer. The negative active substance layer is coated on a surface of the negative current collector, and the negative current collector not coated with the negative active substance layer protrudes from the negative current collector coated with the negative active substance layer and is used as a negative tab. A material of the negative current collector may be copper, and the negative active substance may be carbon or silicon, etc. In order to ensure that no fusing occurs when a large current passes, there are a plurality of positive tabs which are stacked together, and there are a plurality of negative tabs which are stacked together. A material of the separator may be PP (polypropylene) or PE (polyethylene), etc. In addition, the electrode assembly may be in a winding structure or a laminated structure, and the embodiment of the present application is not limited thereto.

For a general battery cell, an electrode assembly needs to be electrically connected to a housing, so that the housing can serves as a positive output electrode or a negative output electrode of the battery cell. Currently, the electrical connection between the electrode assembly and the housing is prone to failure.

In the battery cell, the housing is a hollow structure with an opening at one end, the housing has a bottom wall arranged opposite to the opening, a tab of the electrode assembly and the housing are electrically connected through a current collecting member, where the current collecting member and the bottom wall of the housing are welded so that the housing serves as an output electrode (a positive output electrode or a negative output electrode) of the battery cell. By research, the inventor finds that the electrode assembly has a large moving space in the housing. Since the current collecting member is welded with the bottom wall of the housing, the electrode assembly will produce a large displacement relative to the housing when the battery cell is in a vibration environment, so that connection between the tab of the electrode assembly and the current collecting member fails, and there is a risk of failure of the electrical connection between the electrode assembly and the housing.

In view of this, an embodiment of the present application provides a battery cell. The battery cell includes an electrode assembly, a housing, an end cover, and a current collecting member. The electrode assembly has a tab. The housing has an opening, where the housing is configured to accommodate the electrode assembly. The end cover is configured to cover the opening and connect to the housing in a sealing manner. The current collecting member is located in the housing, and is configured to connect the tab and the housing to realize electrical connection between the tab and the housing. An inner side surface of the housing is protruded with a first restraint member, the first restraint member is configured to restrain movement of the end cover in a direction close to the electrode assembly, and the current collecting member abuts against a side of the first restraint member facing the electrode assembly.

In such a battery cell, the electrical connection between the tab and the housing is realized through the current collecting member, and the current collecting member abuts against the side of the first restraint member facing the electrode assembly to ensure good current flow between the current collecting member and the housing. The first restraint member not only has a restraining effect on the end cover, but also has a restraining effect on the current collecting member, so that the current collecting member restrains movement of the electrode assembly, reduces a displacement of the movement of the electrode assembly in the housing in a direction of the end cover, reduces the risk of failure of the connection between the tab and the current collecting member due to the excessive displacement of the electrode assembly, and further reduces the risk of failure of the electrical connection between the battery assembly and the housing.

In addition, since the current collecting member abuts against the side of the first restraint member facing the electrode assembly, the first restraint member can have an effect of separating the current collecting member and the end cover. On one hand, influence of the current collecting member on the end cover is reduced, and sealing between the end cover and the housing is improved, and on the other hand, the current collecting member is enabled farther away from the end cover so as to reduce the risk of electrification of the end cover.

The battery cell described in the embodiment of the present application is applicable to a battery and a power consumption device using the battery.

The power consumption device can be a vehicle, a mobile phone, a portable device, a notebook computer, a ship, a spacecraft, an electric toy, an electric tool, and so on. The vehicle may be a fuel vehicle, a gas vehicle or a new energy vehicle; the new energy vehicle may be a battery electric vehicle, a hybrid vehicle or an extended range vehicle, etc.; the spacecraft includes an airplane, a rocket, a space shuttle and a spaceship, etc.; the electric toy includes a fixed or mobile electric toy, such as a game console, an electric vehicle toy, an electric ship toy and an electric airplane toy, etc.; the electric tool includes a metal cutting power tool, a grinding power tool, an assembly power tool and a railway power tool, such as an electric drill, an electric grinder, an electric wrench, an electric screwdriver, an electric hammer, an impact drill, a concrete vibrator, and an electric planer, etc. The embodiment of the present application does not impose special limitation on the above power consumption devices.

For convenience of description, the following embodiments are explained by an example that the power consumption device is a vehicle.

Please refer to FIG. 1, FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 may further include a controller 200 and a motor 300. The controller 200 is configured to control the battery 100 to supply power to the motor 300, for example, for starting, navigating, and working power requirements during driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
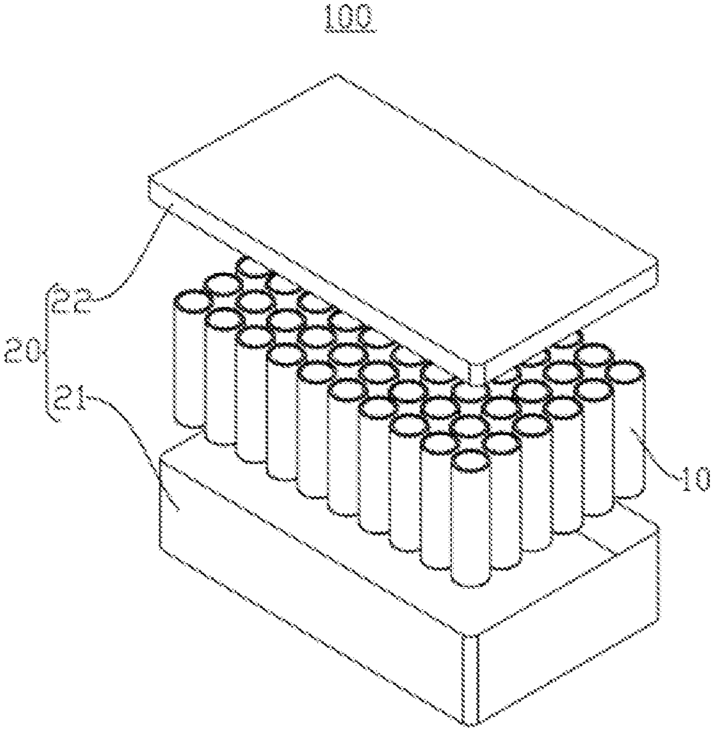
FIG. 2 is a schematic structural diagram of a battery provided by some embodiments of the present application.

In some embodiments, please refer to FIG. 2, FIG. 2 is a schematic structural diagram of a battery 100 provided by some embodiments of the present application. The battery 100 includes a plurality of battery cells 10. The plurality of battery cells 10 may be connected in series, in parallel or in hybrid connection. The hybrid connection means that the plurality of battery cells 10 are both connected in series and in parallel.

In some embodiments, the battery 100 may further include a bus component, and the plurality of battery cells 10 may be electrically connected through the bus component, so as to realize the series, parallel or hybrid connection of the plurality of battery cells 10.

The bus component may be a metal conductor such as copper, iron, aluminum, steel, aluminum alloy, and the like.

In some embodiments, the battery cell 10 may further include a box 20 configured to accommodate the battery cell 10. The box 20 may include a first portion 21 and a second portion 22, and the first portion 21 and the second portion 22 are covered with each other to define an accommodating space for accommodating the battery cell 10. Of course, a connection between the first portion 21 and the second portion 22 can be sealed by a sealing element, and the sealing element may be a sealing ring, a sealant or the like.

Where the first portion 21 and the second portion 22 may have various shapes, such as a cuboid, a cylinder, and the like. The first portion 21 can be a hollow structure with one side open, and the second portion 22 can also be a hollow structure with one side open. The open side of the second portion 22 covers the open side of the first portion 21 to form the box 20 having the accommodating space. Of course, the first portion 21 can also be a hollow structure with one side open, the second portion 22 is a plate-like structure, and the second portion 22 covers the open side of the first portion 21 to form the box 20 having the accommodating space.

Figure 3:
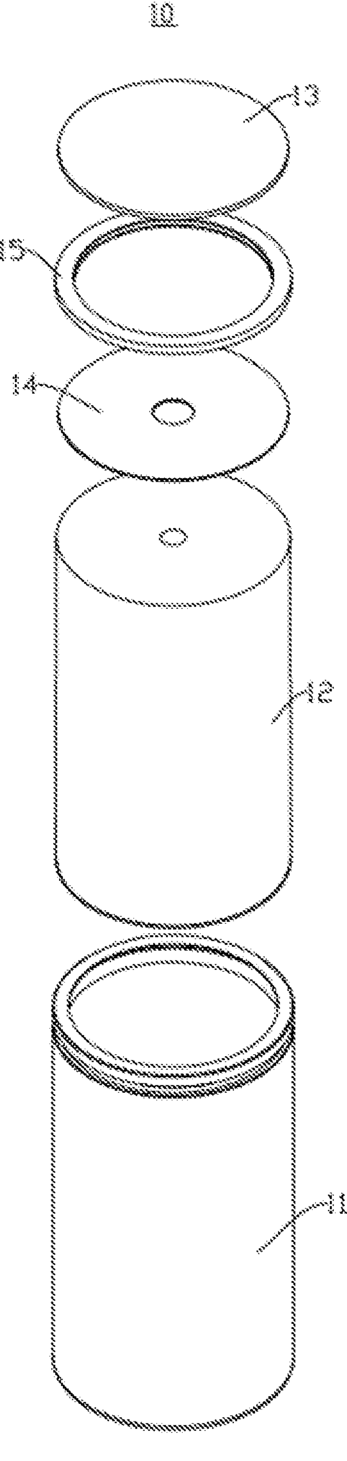
FIG. 3 is an exploded view of a battery cell provided by some embodiments of the present application.

Please refer to FIG. 3, FIG. 3 is an exploded view of a battery cell 10 provided by some embodiments of the present application. The battery cell 10 may include a housing 11, an electrode assembly 12, an end cover 13, a current collecting member 14 and a sealing member 15.

The housing 11 is a component for accommodating the electrode assembly 12. The housing 11 may be a hollow structure with an opening formed at one end, and the housing 11 may also be a hollow structure with openings at both ends. The housing 11 may be made of various materials, such as copper, iron, aluminum, steel, aluminum alloy, and the like. The housing 11 may have various shapes, such as a cylinder, a cuboid, or the like. Exemplarily, in FIG. 3, the housing 11 is a cylinder.

The electrode assembly 12 is a component that is subject to an electrochemical reaction in the battery cell 10. The electrode assembly 12 may include a main body portion 121 and a tab 122, and the tab 122 protrudes from an end of the main body portion 121. The main body portion 121 may include a positive electrode sheet, a negative electrode sheet and a separator. The main body portion 121 may be a winding structure formed by winding the positive electrode sheet, the separator and the negative electrode sheet. The main body portion 121 may also be a laminated structure formed by laminated arrangement of the positive electrode sheet, the separator and the negative electrode sheet.

The positive electrode sheet includes a positive current collector and a positive active substance layer coated on opposite sides of the positive current collector. The negative electrode sheet includes a negative current collector and a negative active substance layer coated on opposite sides of the negative current collector. The main body portion 121 is a part of the electrode assembly 12 that corresponds to a region where an electrode sheet is coated with an active substance layer, and the tab 122 is a part of an electrode sheet that is not coated with an active substance layer. The tab 122 can be divided into a positive tab and a negative tab, and the positive tab and the negative tab protrude from both ends of the main body portion 121 respectively.

The end cover 13 is a component that covers the opening of the housing 11 to isolate the internal environment of the battery cell 10 from the external environment. The end cover 13 covers the opening of the housing 11, and the end cover 13 and the housing 11 together define a sealed space for accommodating the electrode assembly 12, electrolytic solution and the current collecting member 14. The shape of the end cover 13 can be adapted to the shape of the housing 11. For example, the housing 11 is in a cuboid structure, and the end cover 13 is a rectangular plate-shaped structure adapted to the housing 11. For another example, the housing 11 is a cylindrical structure, and the end cover 13 is a circular plate-shaped structure adapted to the housing 11. The end cover 13 may also be made of various materials. Exemplarily, the end cover 13 may be made of a metal material, such as copper, iron, aluminum, steel, aluminum alloy, and the like. The material of the end cover 13 may be the same as or different from the material of the housing 11.

In the battery cell 10, the number of end covers 13 may be one or two. If the housing 11 is a hollow structure with an opening formed at one end, one end cover 13 is correspondingly provided; if the housing 11 is a hollow structure with an opening formed at both ends, two end covers 13 are correspondingly provided, and the two end covers 13 cover two openings of the housing 11 respectively, and one of the positive tab and the negative tab of the electrode assembly 12 is electrically connected to one end cover 13, and the other end cover 13 is electrically connected to the housing 11. In an embodiment in which the housing 11 is a hollow structure with an opening at one end, an electrode terminal 16 (not shown in FIG. 3) may be provided at one end of the housing 11 away from the end cover 13, the electrode terminal 16 is connected to the housing 11 in an insulating manner, and one of the positive tab and the negative tab of the electrode assembly 12 is electrically connected to the housing 11, and the other is electrically connected to the electrode terminal 16.

The current collecting member 14 is a component located inside the housing 11 and connecting the housing 11 and the electrode assembly 12 to realize electrical connection between the electrode assembly 12 and the housing 11, so that the housing 11 acts as an output electrode of the battery cell 10. The current collecting member 14 may be a disc-shaped member disposed between the end cover 13 and the electrode assembly 12, for example, the housing 11 is a cylinder, and the current collecting member 14 is a disc structure. The current collecting member 14 may be a metal conductor such as copper, iron, aluminum, steel, aluminum alloy, and the like.

The sealing member 15 is a component disposed between the end cover 13 and the housing 11 to realize sealing connection between the end cover 13 and the housing 11. The sealing member 15 may be made of various materials, such as rubber, plastic and so on.

In some embodiments, the battery cell 10 may further include a pressure relief mechanism, and the pressure relief mechanism is configured to be actuated when an internal pressure or temperature of the battery cell 10 reaches a threshold, to relieve the internal pressure of the battery cell 10.

The pressure relief mechanism may be an independent component installed on the end cover 13. For example, the pressure relief mechanism may be an explosion-proof valve, an explosion-proof sheet, an air valve, a pressure relief valve or a safety valve installed on the end cover 13. The pressure relief mechanism may also be a part of the end cover 13. For example, the end cover 13 is provided with an indentation groove, and a region defined by the indentation groove forms the pressure relief mechanism.

The word "actuated" means that the pressure relief mechanism acts or is actuated to a certain state, so that the internal pressure and temperature of the battery cell 10 can be relieved. The action generated by the pressure relief mechanism may include but be not limited to: at least a part of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure and temperature of the battery cell 10 can be relieved at a controllable pressure or temperature, thereby avoiding potential and more serious accidents.

The emissions from the battery cell 10 mentioned in the present application include but are not limited to: an electrolytic solution, dissolved or split positive and negative electrode sheet, fragments of a separator, a high temperature and high pressure gas generated by a reaction, flames, etc.

Figure 4:
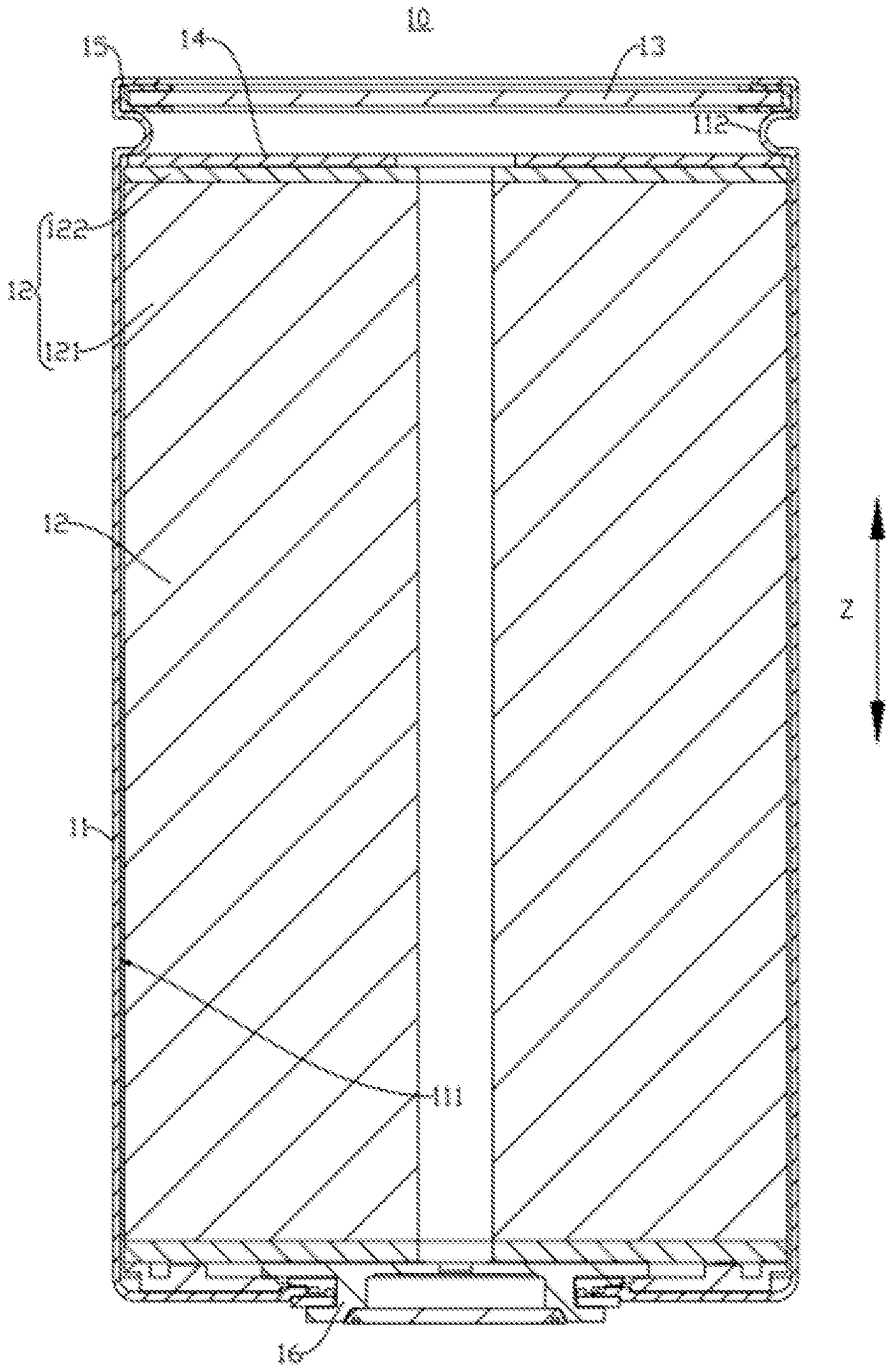
FIG. 4 is a cross-sectional view of the battery cell shown in FIG. 3.

Please refer to FIG. 4, FIG. 4 is a cross-sectional view of the battery cell 10 shown in FIG. 3. An embodiment of the present application provides a battery cell 10, including a housing 11, an electrode assembly 12, an end cover 13 and a current collecting member 14. The electrode assembly 12 has a tab 122. The housing 11 has an opening, and the housing 11 is configured to accommodate the electrode assembly 12. The end cover 13 is configured to cover the opening and connected to the housing 11 in a sealing manner. The current collecting member 14 is accommodated in the housing 11 and is located on a side of the electrode assembly 12 facing the end cover 13. The current collecting member 14 is configured to connect the tab 122 and the housing 11 to realize electrical connection between the tab 122 and the housing 11. Where an inner side surface 111 of the housing 11 is protruded with a first restraint member 112, the first restraint member 112 is configured to restrain movement of the end cover 13 in a direction close to the electrode assembly 12, and the current collecting member 14 abuts against a side of the first restraint member 112 facing the electrode assembly 12.

The current collecting member 14 is a component that realizes the electrical connection between the housing 11 and the tab 122. The current collecting member 14 and the tab 122 may be fixedly connected, for example, the current collecting member 14 and the tab 122 are welded. The tab 122 referred to here may be a positive tab of the electrode assembly 12 or a negative tab of the electrode assembly 12, that is, the current collecting member 14 may be connected to the positive tab 122 or the negative tab 122. Exemplarily, in FIG. 4, an electrode terminal 16 may be provided at one end of the housing 11 away from the end cover 13, the electrode terminal 16 is connected to the housing 11 in an insulating manner, the negative tab of the electrode assembly 12 is connected to the current collecting member 14, and the positive tab of the electrode assembly 12 is connected to the electrode terminal 16.

The current collecting member 14 abuts against the side of the first restraint member 112 facing the electrode assembly 12, so that the current collecting member 14 and the first restraint member 112 are in contact with each other, so as to realize the electrical connection between the current collecting member 14 and the housing 11. Both the current collecting member 14 and the first restraint member 112 may only maintain an abutting relationship, or they may be abutted with each other and then fixed together, for example, both the current collecting member 14 and the first restraint member 112 are abutted with each other and welded together. The current collecting member 14 abuts against the side of the first restraint member 112 facing the electrode assembly 12, and the current collecting member 14 may occupy a space between the electrode assembly 12 and the first restraint member 112, which reduces a moving space of the electrode assembly 12 in the housing 11.

The inner side surface 111 of the housing 11 refers to an inner side surface of a side wall of the housing 11 extending in a thickness direction Z of the end cover 13. It can be understood that the inner side surface 111 substantially extends in the thickness direction Z of the end cover 13. In an embodiment in which the housing 11 is a cylinder, the inner side surface 111 of the housing 11 is a cylindrical surface. In an embodiment in which the housing 11 is a cuboid, the inner side surface 111 of the housing 11 includes four side surfaces located in different directions and connected end to end.

The inner side surface 111 of the housing 11 is protruded with the first restraint member 112. It can be understood that the first restraint member 112 protrudes from the inner side surface 111. The first restraint member 112 is a structure for the housing 11 to restrain the movement of the end cover 13 in the direction close to the electrode assembly 12. The current collecting member 14 abuts against the side of the first restraint member 112 facing the electrode assembly 12, and the current collecting member 14 is located on the side of the electrode assembly 12 facing the end cover 13. It can be understood that in the thickness direction Z of the end cover 13, the first restraint member 112 is located between the electrode assembly 12 and the end cover 13. The first restraint member 112 and the housing 11 may be an integrated structure, or may be a structure that is formed separately and then connected together. For example, the first restraint member 112 and the housing 11 are welded. The first restraint member 112 may have various structures. For example, the first restraint member 112 is a boss protruding from the inner side surface 111 of the housing 11. For another example, the first restraint member 112 is in an annular structure extending in a circumferential direction of the housing 11.

The electrical connection between the tab 122 and the housing 11 is realized through the current collecting member 14, and the current collecting member 14 abuts against the side of the first restraint member 112 facing the electrode assembly 12 to ensure good current flow between the current collecting member 14 and the housing 11. The first restraint member 112 not only has a restraining effect on the end cover 13, but also has a restraining effect on the current collecting member 14, so that the current collecting member 14 restrains movement of the electrode assembly 12, reduces a displacement of the movement of the electrode assembly 12 in the housing 11 in the direction of the end cover 13, reduces the risk of failure of the connection between the tab 122 and the current collecting member 14 due to the excessive displacement of the electrode assembly 12, and further reduces the risk of failure of the electrical connection between the assembly of the battery assembly and the housing 11.

In addition, since the current collecting member 14 abuts against the side of the first restraint member 112 facing the electrode assembly 12, the first restraint member 112 can play a role of separating the current collecting member 14 and the end cover 13. On one hand, influence of the current collecting member 14 on the end cover 13 is reduced, and sealing between the end cover 13 and the housing 11 is improved, and on the other hand, the current collecting member 14 is enabled farther away from the end cover 13 so as to reduce the risk of electrification of the end cover 13.

Figure 5:
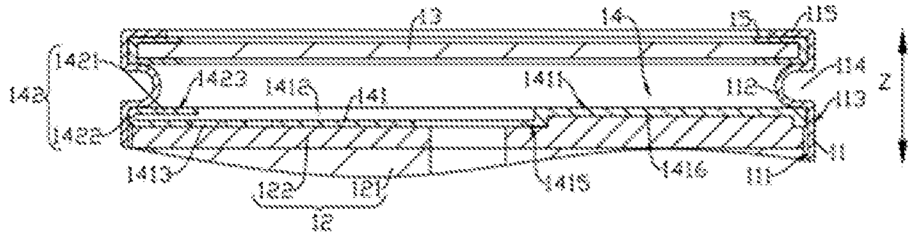
FIG. 5 is a partial view of a battery cell provided by some embodiments of the present application.

In some embodiments, please refer to FIG. 5, FIG. 5 is a partial view of a battery cell 10 provided by some embodiments of the present application, and the current collecting member 14 includes a body portion 141 and an elastic portion 142. The body portion 141 is located on the side of the first restraint member 112 facing the electrode assembly 12, and the body portion 141 is configured to connect the tab 122. The elastic portion 142 is connected to the body portion 141, and the elastic portion 142 is configured to abut against the first restraint member 112 in a direction away from the electrode assembly 12.

The body portion 141 is a part of the current collecting member 14 that is connected to the tab 122, so as to realize electrical connection between the current collecting member 14 and the electrode assembly 12. Exemplarily, the body portion 141 is welded with the tab 122. In an example where the housing 11 is a cylinder, the body portion 141 may be a disc structure located in the housing 11.

The elastic portion 142 is a part of the current collecting member 14 that abuts against the first restraint member 112 and has elastic deformability. The elastic portion 142 abuts against the first restraint member 112 in a direction away from the electrode assembly 12. It can be understood that the elastic portion 142 abuts against the side of the first restraint member 112 facing the electrode assembly 12. The elastic portion 142 is located on the side of the body portion 141 facing the first restraint member 112. Both the elastic portion 142 and the body portion 141 may be an integrated structure, or both may be a structure that is separately formed and then connected together. The elastic portion 142 may have various structures, for example, the elastic portion 142 is an elastic sheet, and for another example, the elastic portion 142 is a spring. The number of elastic portions 142 connected to the body portion 141 may be one or more.

The elastic portion 142 abuts against the first restraint member 112 in the direction away from the electrode assembly 12. The elastic portion 142 has elastic deformability, and the elastic portion 142 can be elastically deformed according to the change of a distance between the body portion 141 and the first restraint member 112, so that the elastic portion 142 has a good buffering effect on the electrode assembly 12, which reduces the risk of damage due to rigid impact between the electrode assembly 12 and the current collecting member 14. In addition, the elastic portion 142 will always maintain an abutting state of abutting against the first restraint member 112 when the assembly of the battery 100 moves in the housing 11 due to vibration of the battery cell 10, which reduces the risk of failure of the electrical connection between the current collecting member 14 and the housing 11 due to the vibration of the battery cell 10.

In some embodiments, please continue to refer to FIG. 5, the elastic portion 142 is an elastic sheet that is bent and arranged on the body portion 141.

The elastic sheet refers to a sheet body with elasticity, and the elastic sheet may be made of a metal material, for example, the elastic sheet is a copper sheet, an aluminum sheet, etc.

The elastic sheet is bent and arranged on the body portion 141. It can be understood that the elastic sheet is in a bending state, so that it has elastic deformability itself. Before the elastic sheet is molded, the elastic sheet can be in a linear structure, and after the elastic sheet is bent and molded, the elastic sheet is in a fold-line structure, so that the elastic sheet has the elastic deformability.

In this embodiment, the elastic portion 142 is an elastic sheet that is bent and arranged on the body portion 141, which is simple in structure, easy to mold, and has good deformability. In addition, the elastic sheet can realize a large-area contact with a protruding portion, which is beneficial for current flow.

In some embodiments, please continue to refer to FIG. 5, the elastic portion 142 includes a first bending portion 1421 and a second bending portion 1422, the first bending portion 1421 is configured to abut against the first restraint member 112, and the second bending portion 1422 is configured to connect the first bending portion 1421 and the body portion 141. In a thickness direction Z of the end cover 13, a gap is provided between a part of the body portion 141 opposite to the first bending portion 1421 the first bending portion 1421.

The first bending portion 1421 is a part of the elastic portion 142 that abuts against the first restraint member 112. After the first bending portion 1421 abuts against the first restraint member 112, the first bending portion 1421 and the first restraint member 112 may be stacked in the thickness direction Z of the end cover 13. The first bending portion 1421 may be a plate-shaped sheet body.

The second bending portion 1422 is a part of the elastic portion 142 that connects the first bending portion 1421 and the body portion 141 together. The second bending portion 1422 is bent and arranged relative to the first bending portion 1421, and a crease is formed at a connection between the second bending portion 1422 and the first bending portion 1421. The second bending portion 1422 may also be a plate-shaped sheet body.

In the thickness direction Z of the end cover 13, the part of the body portion 141 opposite to the first bending portion 1421 is a part of the body portion 141 covered by projection of the first bending portion 1421.

In this embodiment, the elastic portion 142 includes the first bending portion 1421 and the second bending portion 1422 connected to each other. The first bending portion 1421 and the second bending portion 1422 can be formed by means of bending, which is simple to mold. The gap is provided between the portion of the body portion 141 opposite to the first bending portion 1421 and the first bending portion 1421, and the gap between the body portion 141 and the first bending portion 1421 can provide a deformation space for the first bending portion 1421, so that the first bending portion 1421 not only has an ability to be deformed in a direction away from the body portion 141, but also has an ability to be deformed in a direction close to the body portion 141, and thus the elastic portion 142 has a good buffering effect on the electrode assembly 12 when the electrode assembly 12 moves in a direction close to the end cover 13, which reduces the risk of damage due to rigid impact between the electrode assembly 12 and the current collecting member 14.

Figure 6:
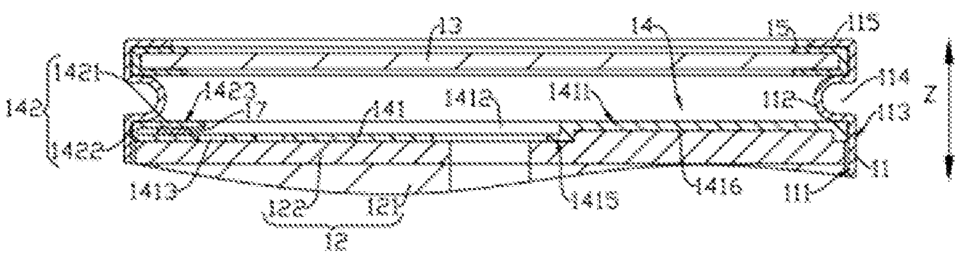
FIG. 6 is a partial view of a battery cell provided by other embodiments of the present application.

In some embodiments, please refer to FIG. 6, FIG. 6 is a partial view of a battery cell 10 provided by other embodiments of the present application. The battery cell 10 further includes an elastic layer 17, and the elastic layer 17 is supported between the body portion 141 and the first bending portion 1421.

The elastic layer 17 is an elastic member supported between the body portion 141 and the first bending portion 1421. The elastic layer 17 may be a component such as a spring, elastic rubber or the like.

The elastic layer 17 can have a good elastic support effect on the first bending portion 1421, enhance a buffering effect of the elastic portion 142 on the electrode assembly 12, and improve the ability of restoring deformation after deformation of the first bending portion 1421 in the direction close to the body portion 141.

In some embodiments, please refer to FIGS. 5 and 6, the second bending portion 1422 is connected to an edge of the body portion 141, and the first bending portion 1421 is bent and arranged in a direction close to the body portion 141 relative to the second bending portion 1422.

The edge of the body portion 141 refers to an edge position where an outer peripheral surface of the body portion 141 is located. Assuming that the second bending portion 1422 and the first bending portion 1421 are coplanar before the elastic portion 142 is molded, the first bending portion 1421 and the second bending portion 1422 are located on different planes by bending the second bending portion 1422 in the direction close to the body portion 141 relative to the first bending portion 1421, so that the first bending portion 1421 is bent and arranged in the direction close to the body portion 141 relative to the second bending portion 1422.

Exemplarily, in an example where the body portion 141 is in a disc-shaped structure, in a radial direction of the body portion 141, one end of the second bending portion 1422 away from the first bending portion 1421 exceeds the first restraint member 112.

The second bending portion 1422 is connected to the edge of the body portion 141, so that the second bending portion 1422 has good deformability relative to the body portion 141. The first bending portion 1421 is bent and arranged in the direction close to the body portion 141 relative to the second bending portion 1422, so that the first bending portion 1421 has good deformability relative to the second bending portion 1422, and thus the whole elastic portion 142 has good deformability. In addition, since the second bending portion 1422 is connected to the edge of the body portion 141, the second bending portion 1422 is allowed to be closer to the inner side surface 111 of the housing 11, and more of the first bending portion 1421 can abut against the first restraint member 112, which increases a contact area between the first bending portion 1421 and the first restraint member 112, and increases a current flow area between the current collecting member 14 and the housing 11.

Figure 7:
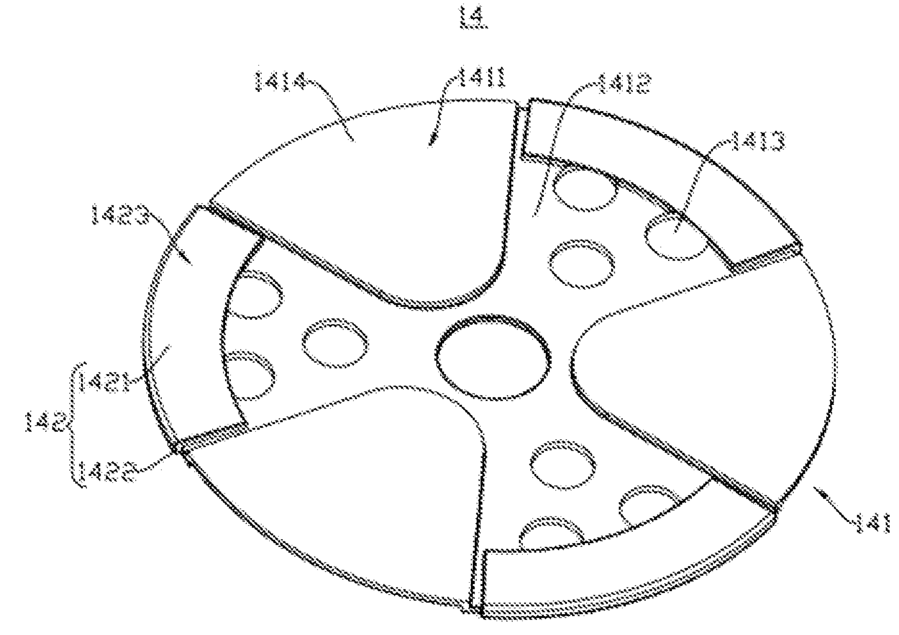
FIG. 7 is a schematic structural diagram of the current collecting member shown in FIG. 5 and FIG. 6.

In some embodiments, please refer to FIGS. 5-7, FIG. 7 is a schematic structural diagram of the current collecting member 14 shown in FIGS. 5 and 6, the body portion 141 has an outer surface 1411 facing the end cover 13, the outer surface 1411 of the body portion 141 is provided with a first accommodating portion 1412, and the first accommodating portion 1412 is configured to accommodate at least a part of the elastic portion 142.

The outer surface 1411 of the body portion 141 refers to a surface of the body portion 141 facing the end cover 13 and closest to the end cover 13. The outer surface 1411 is provided with the first accommodating portion 1412, and it can be understood that the first accommodating portion 1412 is recessed from the outer surface 1411 of the body portion 141 in the direction close to the electrode assembly 12.

The first accommodating portion 1412 may be a groove structure disposed on the outer surface 1411 of the body portion 141. The first accommodating portion 1412 plays a role of accommodating the elastic portion 142, and the elastic portion 142 may be entirely accommodated in the first accommodating portion 1412, or the elastic portion 142 may be partially accommodated in the first accommodating portion 1412. The number of first accommodating portions 1412 may be one or more. For example, the number of elastic portions 142 in the current collecting member 14 is one, and in this case, the number of first accommodating portions 1412 may be one. For another example, the number of elastic portions 142 in the current collecting member 14 is more, and in this case, the number of first accommodating portions 1412 may also be more, and each first accommodating portion 1412 accommodates at least one first elastic portion 142.

In an example where the elastic portion 142 includes the first bending portion 1421 and the second bending portion 1422, both the first bending portion 1421 and the second bending portion 1422 are accommodated in the first accommodating portion 1412, so that the elastic portion 142 is completely accommodated in the first accommodating portion 1412; or the first bending portion 1421 is accommodated in the first accommodating portion 1412, and the second bending portion 1422 is at least partially located outside the first accommodating portion 1412, so that the elastic portion 142 is partially accommodated in the first accommodating portion 1412. In the embodiment in which a gap is provided between the portion of the body portion 141 opposite to the first bending portion 1421 and the first bending portion 1421, in the thickness direction Z of the end cover 13, the first bending portion 1421 is arranged opposite to a bottom surface the first accommodating portion 1412.

The outer surface 1411 of the body portion 141 is provided with the first accommodating portion 1412, and the first accommodating portion 1412 can provide an accommodating space for the elastic portion 142, which reduces the size of the elastic portion 142 protruding from the outer surface 1411 of the body portion 141, reduces an internal space of the housing 11 occupied by the elastic portion 142, frees up more space for the electrode assembly 12, and is beneficial to improving energy density of the battery cell 10.

In some embodiments, please continue to refer to FIGS. 5-7, the elastic portion 142 has an abutting surface 1423 facing the end cover 13, the abutting surface 1423 is configured to abut against the first restraint member 112, and the abutting surface 1423 is flush with the outer surface 1411.

The abutting surface 1423 refers to a surface of the elastic portion 142 for abutting against the first restraint member 112. The abutting surface 1423 is flush with the outer surface 1411, that is, the abutting surface 1423 is coplanar with the outer surface 1411. Both the abutting surface 1423 and the outer surface 1411 are flat surfaces.

The abutting surface 1423 is flush with the outer surface 1411 of the body portion 141, so that the outer surface 1411 of the body portion 141 can also abut against the first restraint member 112, which increases a contact area between the current collecting member 14 and the first restraint member 112, and further increases a current flow area between the current collecting member 14 and the housing 11.

In some embodiments, a through hole 1413 is provided in a region of the body portion 141 where the first accommodating portion 1412 is provided.

The through hole 1413 is provided in the region of the body portion 141 where the first accommodating portion 1412 is provided, in other words, the bottom surface of the first accommodating portion 1412 is provided with the through hole 1413. The through hole 1413 on the body portion 141 forms a discharge channel for discharging emissions inside the battery cell 10. The body portion 141 has an inner surface 1415 facing the electrode assembly 12, and the inner surface 1415 of the body portion 141 is a surface of the body portion 141 facing the electrode assembly 12 and closest to the electrode assembly 12. The through hole 1413 may pass through the bottom surface of the first accommodating portion 1412 and the inner surface 1415 of the body portion 141 at the same time to form the discharge channel.

The number of through holes 1413 provided in the region of the body portion 141 where the first accommodating portion 1412 is provided may be one or more. Exemplarily, in FIG. 7, a plurality of through holes 1413 are provided in the region of the body portion 141 where the first accommodating portion 1412 is provided.

In an embodiment in which the end cover 13 has a pressure relief mechanism, emissions inside the battery cell 10 flow through the through hole 1413 and are finally discharged to the outside of the battery cell 10 through the pressure relief mechanism.

The body portion 141 is provided with the through hole 1413, and emissions inside the battery cell 10 located on the side of the body portion 141 facing the electrode assembly 12 can flow to the side of the body portion 141 facing the end cover 13 through the through hole 1413, which is beneficial for the internal emissions to be discharged to the outside of the battery cell 10 when the battery cell 10 suffers from thermal runaway, and improves the safety of the battery cell 10.

In some embodiments, please continue to refer to FIG. 7, the body portion 141 is provided with a plurality of elastic portions 142 distributed at intervals in a circumferential direction of the body portion 141.

In an embodiment in which the body portion 141 is provided with the first accommodating portion 1412 for accommodating the elastic portion 142, one first accommodating portion 1412 may be correspondingly provided with at least one elastic portion 142, that is, one first accommodating portion 1412 may accommodate one elastic portion 142, or one first accommodating portion 1412 may accommodate a plurality of elastic portions 142. Exemplarily, in FIG. 7, one first accommodating portion 1412 is configured to accommodate one elastic portion 142, the first accommodating portion 1412 is substantially fan-shaped, and the plurality of first accommodating portions 1412 meet at the center location of the body portion 141. A central pore configured to be opposite to a central hole of the electrode assembly 12 is provided at the center location of the body portion 141.

The plurality of elastic portions 142 distributed at intervals in the circumferential direction of the body portion 141 can all abut against the first restraint member 112, which increases a contact area between the current collecting member 14 and the first restraint member 112, further increases a current flow area between the current collecting member 14 and the housing 11, and realizes a large area of current flow. In addition, the plurality of elastic portions 142 distributed at intervals in the circumferential direction of the body portion 141 can all have a buffering effect on the electrode assembly 12, which further reduces the risk of damage to the electrode assembly 12 due to impact.

In some embodiments, please continue to refer to FIG. 7, the body portion 141 has a plurality of welding regions 1414 distributed at intervals in the circumferential direction, the welding regions 1414 are configured to be welded with the tab 122, and at least one of the elastic portions 142 is disposed between two adjacent welding regions 1414 in the circumferential direction of the body portion 141.

The welding regions 1414 are portions of the body portion 141 that realize welding the tab 122. In the circumferential direction of the body portion 141, at least one of the elastic portions 142 is disposed between two adjacent welding regions 1414, that is, one elastic portion 142 or a plurality of elastic portions 142 may be disposed between two adjacent welding regions 1414. Exemplarily, in FIG. 7, one elastic portion 142 is disposed between two adjacent welding regions 1414, so that the elastic portion 142 and the welding region 1414 are arranged alternately in the circumferential direction of the body portion 141.

In the embodiment in which the body portion 141 is provided with the first accommodating portion 1412 for accommodating the elastic portion 142, in the circumferential direction of the body portion 141, one welding region 1414 may be formed between two adjacent first accommodating portions 1412, so that the first accommodating portion 1412 and the welding region 1414 are arranged alternately in the circumferential direction of the body portion 141. Exemplarily, both the welding region 1414 and the first accommodating portion 1412 are substantially fan-shaped, and the number of the elastic portions 142, first accommodating portions 1412 and welding regions 1414 on the body portion 141 are all three.

In this embodiment, at least one elastic portion 142 is disposed between two adjacent welding regions 1414 in the circumferential direction of the body portion 141, so that the elastic portion 142 and the welding regions 1414 configured to be welded with the tab 122 of the body portion 141 are arranged alternately in the circumferential direction of the body portion 141, and a welding mark formed by welding the welding region 1414 and the tab 122 is not easily affected by the elastic portion 142, so that the size of the welding mark in the radial direction of the current collecting member 14 is as large as possible, which reduces the risk of polarization of the electrode assembly 12, and improves the service life of the battery cell 10.

In some embodiments, please continue to refer to FIGS. 5 and 6, the body portion 141 has an inner surface 1415 away from the end cover 13, the inner surface 1415 of the body portion 141 is provided with a second accommodating portion 1416 located in the welding region 1414, and the second accommodating portion 1416 is configured to accommodate at least a portion of the tab 122.

The inner surface 1415 of the body portion 141 is a surface of the body portion 141 facing the electrode assembly 12 and closest to the electrode assembly 12. The inner surface 1415 of the body portion 141 is provided with the second accommodating portion 1416 located in the welding region 1414, and it can be understood that the second accommodating portion 1416 is recessed from the inner surface 1415 of the body portion 141 in the direction away from the electrode assembly 12, and the second accommodating portion 1416 is located in the welding region 1414.

In an example where one welding region 1414 is formed between two adjacent first accommodating portions 1412 in the circumferential direction of the body portion 141, the second accommodating portion 1416 and the first accommodating portion 1412 may be arranged alternately in the circumferential direction of the body portion 141.

The second accommodating portion 1416 can accommodate at least a portion of the tab 122, which reduces an internal space of the housing 11 occupied by the tab 122, frees up more space for the main body portion 121 of the electrode assembly 12, and thus is beneficial to improving energy density of the battery cell 10. In addition, the thickness of a portion of the welding region 1414 provided with the second accommodating portion 1416 is relatively thin, which facilitates the welding and fixing of the welding region 1414 and the tab 122, and ensures the firmness of the welding region 1414 and the tab 122 after welding. In an example where the welding of the welding region 1414 and the tab 122 are implemented by means of penetration welding, since the thickness of the portion of the welding region 1414 provided with the second accommodating portion 1416 is relatively thin, it is easy to penetrate the welding region 1414 and the tab to realize welding, which ensures the firmness of the two after welding.

Figure 8:
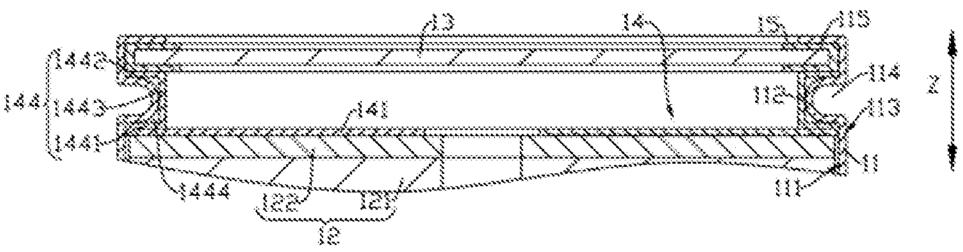
FIG. 8 is a partial view of a battery cell provided by further embodiments of the present application.

In some embodiments, please refer to FIG. 8, FIG. 8 is a partial view of a battery cell 10 provided by yet another embodiments of the present application. The current collecting member 14 includes a body portion 141 and a hook portion 144, the body portion 141 is located on the side of the first restraint member 112 facing the electrode assembly 12, and the body portion 141 is configured to connect the tab 122; and the hook portion 144 is connected to the body portion 141, and the hook portion 144 is configured to hook-fit with the first restraint member 112 to restrain movement of the body portion 141 in a direction close to or away from the end cover 13.

The body portion 141 is a portion of the current collecting member 14 that is connected to the tab 122, so as to realize the electrical connection between the current collecting member 14 and the electrode assembly 12. Exemplarily, the body portion 141 is welded with the tab 122. In an example where the housing 11 is a cylinder, the body portion 141 may be a disc structure located in the housing 11.

The hook portion 144 is a part of the current collecting member 14 that forms a hook fit with the first restraint member 112. The hook portion 144 forms a hook fit with the current collecting member 14 to restrain the movement of the body portion 141 in the direction close to or away from the end cover 13, that is, to restrain the movement of the body portion 141 in the thickness direction Z of the end cover 13. The number of hook portions 144 in the current collecting member 14 may be one or more. In FIG. 8, there are a plurality of hook portions 144 in the current collecting member 14, and the plurality of hook portions 144 may be distributed at intervals in the body portion 141 in the circumferential direction of the body portion 141.

In this embodiment, the hook portion 144 of the current collecting member 14 is hook-fit with the first restraint member 112, which can restrain the movement of the body portion 141 in the direction close to or away from the end cover 13, can always maintain tight contact between the current collecting member 14 and the first restraint member 112, enhances stability of the electrical connection between the current collecting member 14 and the housing 11, and ensures a current flow area between the current collecting member 14 and the housing 11.

In some embodiments, the hook portion 144 includes a first connecting portion 1441, a second connecting portion 1442 and a third connecting portion 1443. The first connecting portion 1441 is connected to the body portion 141, and the first connecting portion 1441 is configured to abut against the side of the first restraint member 112 facing the electrode assembly 12. The second connecting portion 1442 is configured to abut against a side of the first restraint member 112 away from the electrode assembly 12. The third connecting portion 1443 is configured to connect the first connecting portion 1441 and the second connecting portion 1442.

The first connecting portion 1441 is a part of the hook portion 144 that abuts against the side of the first restraint member 112 facing the electrode assembly 12. The second connecting portion 1442 is a part of the hook portion 144 that abuts against the side of the first restraint member 112 away from the electrode assembly 12. It can be understood that, the second connecting portion 1442 and the first connecting portion 1441 abut against two sides of the first restraint member 112 in the thickness direction Z of the end cover 13, respectively. The third connecting portion 1443 is a part of the hook portion 144 that connects the first connecting portion 1441 and the second connecting portion 1442 together.

The first connecting portion 1441 and the second connecting portion 1442 of the hook portion 144 abut against two sides of the first restraint member 112 respectively, so that the hook portion 144 and the first restraint member 112 have a larger contact area, which increases a current flow area between the current collecting member 14 and the housing 11.

In some embodiments, the first connecting portion 1441, the third connecting portion 1443 and the second connecting portion 1442 are connected in sequence and jointly define a restraint groove 1444, and the restraint groove 1444 is configured to accommodate at least a portion of the first restraint member 112.

The restraint groove 1444 is jointly defined by the first connecting portion 1441, the third connecting portion 1443 and the second connecting portion 1442. The first connecting portion 1441, the third connecting portion 1443 and the second connecting portion 1442 are located at three different orientations of the first restraint member 112. For example, the first connecting portion 1441 and the second connecting portion 1442 are respectively located on two sides of the first restraint member 112 in the thickness direction Z of the end cover 13, and the third connecting portion 1443 is located on an inner peripheral side of the first restraint member 112.

Exemplarily, the hook portion 144 may be composed of the first connecting portion 1441, the third connecting portion 1443 and the second connecting portion 1442 connected in sequence by a sheet piece connected to the body portion 141 by means of bending.

In this embodiment, the first connecting portion 1441, the third connecting portion 1443 and the second connecting portion 1442 are connected in sequence and form a restraint groove 1444 for accommodating the first restraint member 112, and the hook portion 144 has a simple structure, and is easy to mold.

Figure 9:
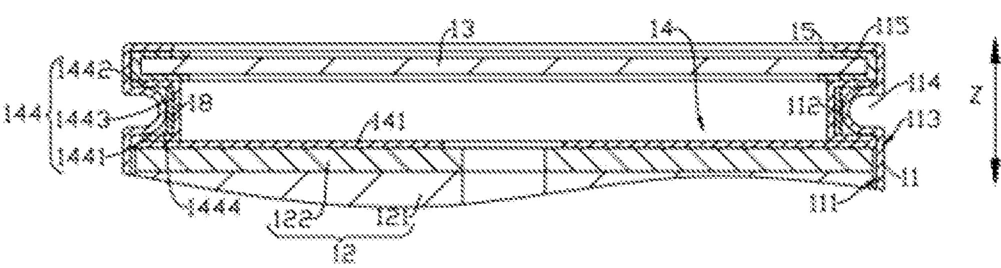
FIG. 9 is a partial view of a battery cell provided by yet another embodiments of the present application.

In some embodiments, please refer to FIG. 9, FIG. 9 is a partial view of a battery cell 10 provided by yet another embodiments of the present application. The battery cell 10 further includes a conductive layer 18, and the conductive layer 18 is configured to connect the first restraint member 112 and the third connecting portion 1443.

The conductive layer 18 is a component that realizes the electrical connection between the first restraint member 112 and the third connecting portion 1443. The conductive layer 18 may be a conductor such as conductive glue, conductive metal, or the like.

After the hook portion 144 is hooked on the first restraint member 112, both the first connecting portion 1441 and the second connecting portion 1442 of the hook portion 144 abut against the first restraint member 112 to keep good contact with the first restraint member 112, but there may be a gap between the third connecting portion 1443 and the first restraint member 112, so that the third connecting portion 1443 and the first restraint member 112 are not in contact.

Therefore, the conductive layer 18 is disposed between the first restraint member 112 and the third connecting portion 1443, which realizes electrical connection between the first restraint member 112 and the third connecting portion 1443, and further increases a current flow area between the current collecting member 14 and the housing 11.

In some embodiments, please continue to refer to FIG. 5, FIG. 6, FIG. 8 and FIG. 9, the first restraint member 112 is in an annular structure extending in a circumferential direction of the housing 11.

In the case where the first restraint member 112 is in an annular structure extending in the circumferential direction of the housing 11, the housing 11 may be in a cylindrical structure.

The first restraint member 112 is in an annular structure, which is easy to mold and manufacture. The first restraint member 112 can restrain the end cover 13 in the entire circumference, which ensures the restraining ability of the first restraint member 112 for the end cover 13 and the current collecting member 14.

In some embodiments, a roller groove 114 is provided at a position of an outer side surface 113 of the housing 11 corresponding to the first restraint member 112.

The outer side surface 113 of the housing 11 refers to an outer side surface of a side wall of the housing 11 extending in the thickness direction Z of the end cover 13. It can be understood that the outer side surface 113 substantially extends in the thickness direction Z of the end cover 13.

During the process of molding the roller groove 114, the housing 11 forms the first restraint member 112 at a position corresponding to the roller groove 114, so as to restrain the current collecting member 14 and the electrode assembly 12 in the housing 11. The molding of the first restraint member 112 is simple, which makes the assembly of the battery cell 10 simpler and more economical.

In some embodiments, the housing 11 has a second restraint member 115, and in a thickness direction Z of the end cover 13, at least a portion of the end cover 13 is located between the first restraint member 112 and the second restraint member 115, and the first restraint member 112 and the second restraint member 115 are configured to jointly restrain movement of the end cover 13 in the thickness direction Z of the end cover 13.

Both the second restraint member 115 and the first restraint member 112 have a restraining effect on the end cover 13, the second restraint member 115 restrains the movement of the end cover 13 in a direction away from the electrode assembly 12, and the first restraint member 112 restrains the movement of the end cover 13 in a direction close to the electrode assembly 12. The second restraint member 115 and the first restraint member 112 restrain the end cover 13 to an end of the housing 11 having an opening.

Exemplarily, the second restraint member 115 may be a flanged structure in which the housing 11 is partially folded inward, and the second restraint member 115 may be formed at the end of the housing 11 by folding the housing 11. During the process of assembling the battery cell 10, the electrode assembly 12 and the current collecting member 14 can be accommodated in the housing 11 first, then a roller groove 114 on the housing 11 is processed to form the first restraint member 112, the end cover 13 abuts against the first restraint member 112, and finally the second restraint member 115 is formed by folding the housing 11, so as to fix the end cover 13 and the housing 11.

In this embodiment, the second restraint member 115 and the first restraint member 112 can jointly restrain the movement of the end cover 13 in the thickness direction Z of the end cover 13, so that the end cover 13 cannot move relative to the housing 11, which ensures the firmness of the connection of the end cover 13 and the housing 11.

In some embodiments, the battery cell 10 further includes a sealing member 15 configured to seal the end cover 13 and the housing 11, and the sealing member 15 is located on a side of the first restraint member 112 away from the electrode assembly 12.

The sealing member 15 is a component for realizing sealing connection between the end cover 13 and the housing 11. The sealing member 15 may be made of rubber, plastic or the like.

Exemplarily, the sealing member 15 is coated on an outer circumference of the end cover 13, the sealing member 15 is partially located between the end cover 13 and the first restraint member 112, and the sealing member 15 is partially located between the end cover 13 and the second restraint member 115.

The sealing connection between the end cover 13 and the housing 11 is realized by the sealing member 15, so as to ensure the sealing of the end cover 13 and the housing 11. The sealing member 15 is located on the side of the first restraint member 112 away from the electrode assembly 12, and the current collecting member 14 is less likely to affect the arrangement of the sealing member 15, which improves the sealing between the end cover 13 and the housing 11.

An embodiment of the present application provides a battery 100, including a plurality of the battery cells 10 provided in any one of the foregoing embodiments.

An embodiment of the present application provides a power consumption device, including the battery 100 provided in any one of the foregoing embodiments.

The power consumption device may be any of the above devices using the battery 100.

In addition, please refer to FIG. 5, an embodiment of the present application further provides a cylindrical cell including a housing 11, an electrode assembly 12, an end cover 13 and a current collecting member 14. The housing 11 and a tab 122 of the electrode assembly 12 are electrically connected through the current collecting member 14. An inner side surface 111 of the housing 11 is protruded with a first restraint member 112 for restraining movement of the end cover 13 in a direction close to the electrode assembly 12. The current collecting member 14 includes a body portion 141 and an elastic portion 142. The body portion 141 is connected to the tab 122 of the electrode assembly 12. The body portion 141 is located on a side of the first restraint member 112 facing the electrode assembly 12, the elastic portion 142 is connected to the body portion 141, and the elastic portion 142 abuts against the first restraint member 112 in a direction away from the electrode assembly 12. The elastic portion 142 can always keep an abutting state with the first restraint member 112, and can ensure electrical connection between the current collecting member 14 and the housing 11 and electrical connection between the current collecting member 14 and the electrode assembly 12 are not prone to failure even in a vibration environment.

Figure 10:
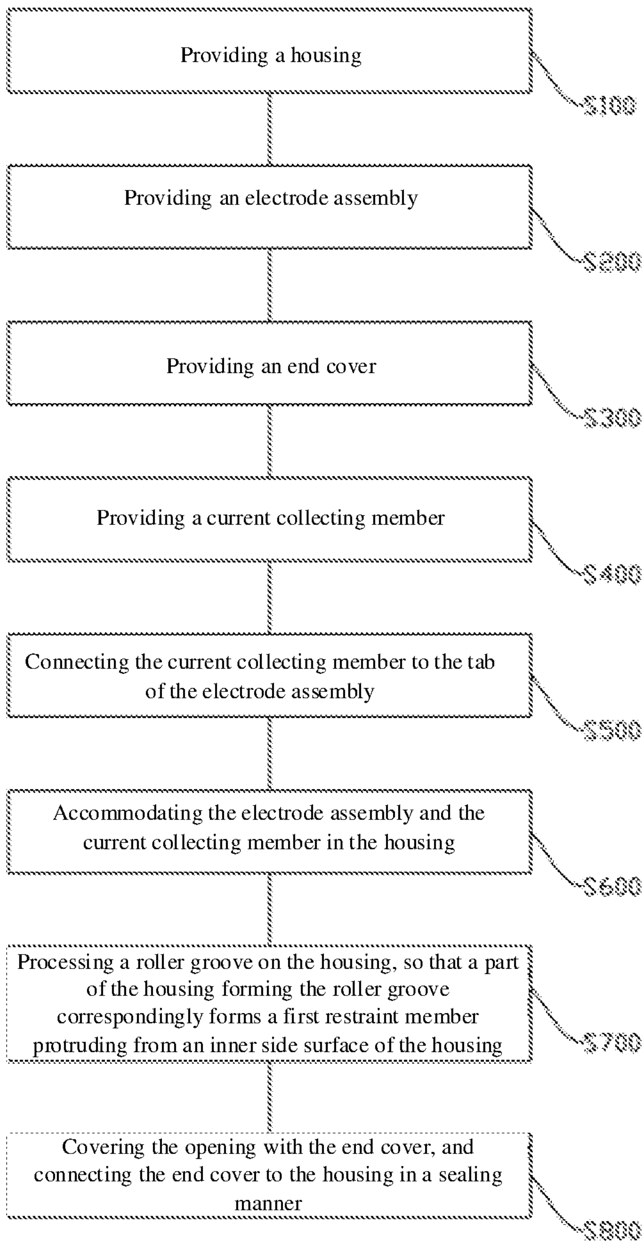
FIG. 10 is a flowchart of a manufacturing method of a battery cell provided by some embodiments of the present application.

An embodiment of the present application provides a manufacturing method of a battery cell 10. Please refer to FIG. 10, FIG. 10 is a flowchart of a manufacturing method of a battery cell 10 provided by some embodiments of the present application. The manufacturing method includes:

- S100: providing a housing 11 having an opening;
- S200: providing an electrode assembly 12 having a tab 122;
- S300: providing an end cover 13;
- S400: providing a current collecting member 14;
- S500: connecting the current collecting member 14 to the tab 122 of the electrode assembly 12;
- S600: accommodating the electrode assembly 12 and the current collecting member 14 in the housing 11;
- S700: processing a roller groove 114 on the housing 11, so that a part of the housing 11 forming the roller groove 114 correspondingly forms a first restraint member 112 protruding from an inner side surface 111 of the housing 11; and
- S800: covering the opening with the end cover 13, and connecting the end cover 13 to the housing 11 in a sealing manner.

Where the first restraint member 112 is configured to restrain movement of the end cover 13 in a direction close to the electrode assembly 12, the current collecting member 14 is located on a side of the electrode assembly 12 facing the end cover 13, and the current collecting member 14 abuts against a side of the first restraint member 112 facing the electrode assembly 12.

In the above method, the sequence of step S100, step S200, step S300 and step S400 is not limited. For example, step S400 may be executed first, then step S300, then step S200, and then step S100.

Figure 11:
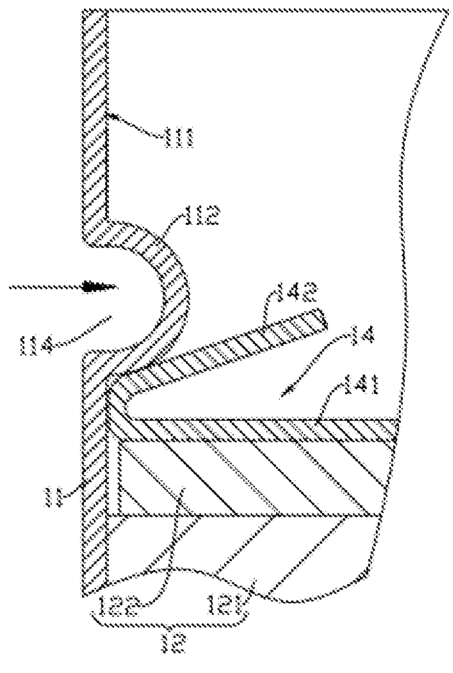
FIG. 11 is a schematic diagram of processing a roller groove on a housing provided by some embodiments of the present application.

In some embodiments, please refer to FIG. 11, FIG. 11 is a schematic diagram of processing a roller groove 114 on the housing 11 provided by some embodiments of the present application. The current collecting member 14 includes a body portion 141 and an elastic portion 142, the body portion 141 is connected to the tab 122, and the elastic portion 142 is connected to the body portion 141. During the process of processing a roller groove 114 on the housing 11, the part of the housing 11 forming the roller groove 114 squeezes the elastic portion 142, so that the elastic portion 142 is bent relative to the body portion 141, and the elastic portion 142 abuts against the first restraint member 112 in a direction away from the electrode assembly 12.

A direction indicated by an arrow in FIG. 11 is a direction of deformation after an extrusion force is applied to the housing 11 during the processing of roller groove 114.

During the process of processing the roller groove 114 on the housing 11, the part of the housing 11 forming the roller groove 114 squeezes the elastic portion 142 of the current collecting member 14, so that the elastic portion 142 is bent relative to the body portion 141 and maintains elastic abutting with the first restraint member 112, that is, after processing the roller groove 114 on the housing 11, the elastic portion 142 of the current collecting member 14 naturally elastically abuts against the first restraint member 112, which improves the assembling efficiency of the battery cell 10.

It should be noted that, in the embodiment in which the current collecting member 14 includes the body portion 141 and the hook portion 144, the part of the housing 11 forming the roller groove 114 during processing of the roller groove 114 may also squeeze a sheet piece connected to the body portion 141 so that the sheet piece is bent and deformed to form the hook portion 144 that is hooked to the first restraint member 112.

Figure 12:
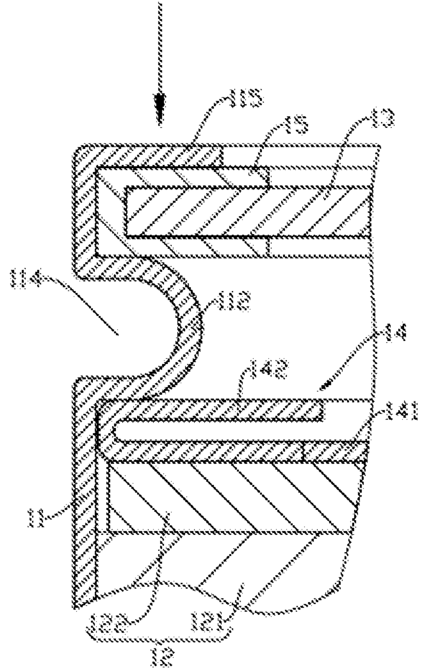
FIG. 12 is a schematic diagram of flanging a housing provided by some embodiments of the present application.

In some embodiments, please refer to FIG. 12, FIG. 12 is a schematic diagram of flanging a housing 11 provided by some embodiments of the present application. After covering the opening with the end cover 13, the manufacturing method further includes:

- flanging the housing 11, so that the housing 11 forms a second restraint member 115, and the second restraint member 115 and the first restraint member 112 jointly restrain movement of the end cover 13 in a thickness direction Z of the end cover 13.

A direction indicated by an arrow in FIG. 12 is a direction of force of the housing 11 when the housing 11 is flanged.

The second restraint member 115 for restraining the end cover 13 is formed by flanging the housing 11. The molding method of the second restraint member 115 is simple, and molding efficiency is high.

It should be noted that, for the related structure of the battery cell 10 manufactured by the manufacturing method provided in the foregoing embodiments, reference may be made to the battery cell 10 provided in the foregoing embodiments, and details are not described herein again.

Figure 13:
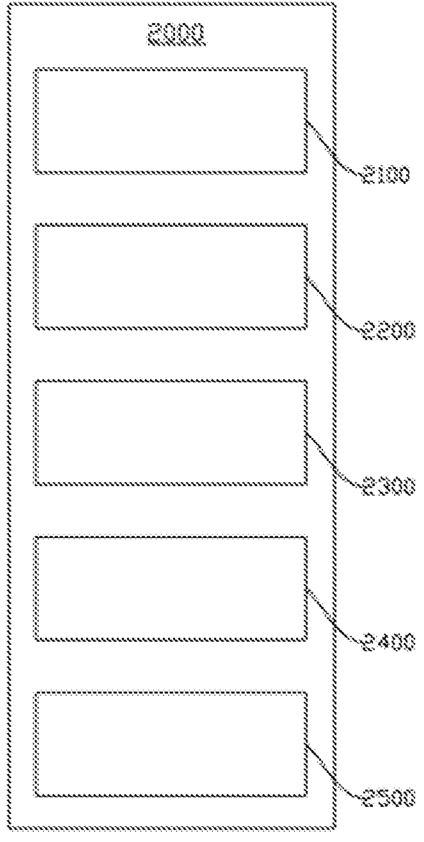
FIG. 13 is a schematic structural diagram of a manufacturing device of a battery cell provided by some embodiments of the present application.

An embodiment of the present application further provides a manufacturing device 2000 of a battery cell 10. Please refer to FIG. 13, FIG. 13 is a schematic structural diagram of a manufacturing device 2000 of a battery cell 10 provided by some embodiments of the present application, including a first providing apparatus 2100, a second providing apparatus 2200, a third providing apparatus 2300, a fourth providing apparatus 2400 and an assembling apparatus 2500.

The first providing apparatus 2100 is configured to provide a housing 11 having an opening. The second providing apparatus 2200 is configured to provide an electrode assembly 12 having a tab 122. The third providing apparatus 2300 is configured to provide an end cover 13. The fourth providing apparatus 2400 is configured to provide a current collecting member 14. The assembling apparatus 2500 is configured to connect the current collecting member 14 to the tab 122; the assembling apparatus 2500 is further configured to accommodate the electrode assembly 12 and the current collecting member 14 in the housing 11; the assembling apparatus 2500 is further configured to process a roller groove 114 on the housing 11, so that a part of the housing 11 forming the roller groove 114 correspondingly forms a first restraint member 112 protruding from an inner side surface 111 of the housing 11; and the assembling apparatus 2500 is further configured to cover the opening with the end cover 13, and connect the end cover 13 to the housing 11 in a sealing manner.

The first restraint member 112 is configured to restrain movement of the end cover 13 in a direction close to the electrode assembly 12, the current collecting member 14 is located on a side of the electrode assembly 12 facing the end cover 13, and the current collecting member 14 abuts against a side of the first restraint member 112 facing the electrode assembly 12.

It should be noted that, for the related structure of the battery cell 10 manufactured by the manufacturing device 2000 provided in the foregoing embodiment, reference may be made to the battery cell 10 provided by the foregoing embodiments, and details are not described herein again.

It should be noted that, the embodiments in the present application and features in the embodiments may be combined with each other in case of no conflict.

The above embodiments are merely used to illustrate the technical solution of the present application, but are not intended to limit the present application. For those skilled in the art, the present application may have various amendments and variations. Any modification, equivalent substitution, and improvement made within the spirit and principle of the present application shall fall within the protection scope of the present application.

What is claimed is:

1. A battery cell, comprising:

an electrode assembly having a tab;

a housing having an opening, wherein the housing is configured to accommodate the electrode assembly;

an end cover configured to cover the opening and connect to the housing in a sealing manner; and a current collecting member accommodated in the housing and located on a side of the electrode assembly facing the end cover, wherein the current collecting member is configured to connect the tab and the housing to realize electrical connection between the tab and the housing, wherein an inner side surface of the housing is protruded with a first restraint member, the first restraint member is configured to restrain movement of the end cover in a direction close to the electrode assembly, and the current collecting member abuts against a side of the first restraint member facing the electrode assembly, wherein the current collecting member comprises:

a body portion located on the side of the first restraint member facing the electrode assembly, wherein the body portion is configured to connect the tab, the body portion extends in a direction perpendicular to the direction of a thickness of the end cover; and a hook portion, wherein the hook portion comprises:

a first connecting portion connected to the body portion, wherein the first connecting portion is configured to abut against the side of the first restraint member facing the electrode assembly, the first connecting portion is parallel to the body portion;

a second connecting portion configured to abut against the side of the first restraint member away from the electrode assembly, the second connecting portion is parallel to the body portion; and a third connecting portion configured to connect the first connecting portion and the second connecting portion, the third connecting portion is located on an inner peripheral side of the first restraint member and is perpendicular to the body portion;

wherein the first connecting portion, the third connecting portion and the second connecting portion are connected in sequence and jointly define a restraint groove, and the restraint groove is configured to accommodate at least a part of the first restraint member;

wherein the side of the first connecting portion facing the electrode assembly abuts against the body portion along the direction of the thickness of the end cover, and the hook portion and the body portion are of an integrated structure.

2. The battery cell according to claim 1, wherein the battery cell further comprises:

a conductive layer, wherein the conductive layer is configured to connect the first restraint member and the third connecting portion.

3. The battery cell according to claim 1, wherein the first restraint member is in an annular structure extending in a circumferential direction of the housing.

4. The battery cell according to claim 1, wherein a roller groove is provided at a position of an outer side surface of the housing corresponding to the first restraint member.

5. The battery cell according to claim 1, wherein the housing has a second restraint member, and in a thickness direction of the end cover, at least a part of the end cover is located between the first restraint member and the second restraint member, and the first restraint member and the second restraint member are configured to jointly restrain movement of the end cover in the thickness direction of the end cover.

6. The battery cell according to claim 1, wherein the battery cell further comprises:

a sealing member configured to seal the end cover and the housing, wherein the sealing member is located on the side of the first restraint member away from the electrode assembly.

* * * * *